United States Patent [19]

Howard

[11] Patent Number: 4,588,340

[45] Date of Patent: May 13, 1986

[54] METHOD AND APPARATUS FOR SECURING WHEELCHAIRS

[76] Inventor: Atlas Howard, 157 Connecticut Ave., Stamford, Conn. 06902

[21] Appl. No.: 505,311

[22] Filed: Jun. 17, 1983

[51] Int. Cl.[4] .......................... B60P 3/06; B60N 1/02

[52] U.S. Cl. .......................... 410/7; 188/2 F; 248/507; 410/19; 410/51; 296/65 R

[58] Field of Search .................... 410/3, 7, 21, 51, 81, 410/4, 9, 19; 280/242 WC, 289 WC; 296/65 R; 248/500, 507, 509; 211/5, 20, 21; 297/DIG. 4; 188/2 F, 32, 69

[56] References Cited

U.S. PATENT DOCUMENTS 4,019,752 4/1977 Leon et al. .......................... 410/7 X 4,083,594 4/1978 Tullock .......................... 410/9 X 4,093,303 6/1978 Nelson .......................... 410/51 X 4,325,576 4/1982 Guthrie .......................... 410/51 X

*Primary Examiner*—Randolph Reese

*Assistant Examiner*—Mark Abate

*Attorney, Agent, or Firm*—Grimes & Battersby

[57] ABSTRACT

A method and apparatus for securing conventional and small-wheel, carriage-type wheelchairs comprising an interconnected structure which in a single motion can simultaneously be released and/or engaged by exerting force on an interconnecting member, the apparatus including a handle locking mechanism attached to one end of the interconnecting member and a wheel locking mechanism attached to an actuating mechanism attached to the other end of the interconnecting member.

16 Claims, 6 Drawing Figures

METHOD AND APPARATUS FOR SECURING WHEELCHAIRS

BACKGROUND OF THE INVENTION

The present invention relates to transport of invalid individuals in general and more particularly is directed to an improved method and apparatus for use in transporting invalid individuals in wheelchairs. Still more particularly the invention relates to an improved method and apparatus for transporting invalid individuals in small-wheel, carriage-type wheelchairs.

It is already known to transport an invalid individual by leaving him in his wheelchair and by placing both the individual and his wheelchair in a transport vehicle and then locking the wheelchair against movement within the transport vehicle. Prior art methods and apparatus disclose mechanisms mounted on side walls of transport vehicles for securing the wheels of an invalid individual's wheelchair to the side walls of transport vehicles. In this manner, the often strenuous task of lifting the individual out of his wheelchair and shifting him into a seat in the transport vehicle is avoided. In addition, the discomfort often suffered by the individual during such shifting is avoided and the ride itself is more comfortable for the individual while he is in the wheelchair.

While the prior art methods and apparatus have been found to be acceptable for conventional wheelchairs, it has been found that a problem can develop when attempting to use such prior art methods and apparatus to safely transport invalid individuals who are confined in small-wheel, carriage-type wheelchairs. The problem is in securing such small-wheel, carriage-type wheelchairs against twisting motion and/or turning over on their sides when, for example, the transport vehicle makes a sudden stop or goes around a sharp turn. Prior art methods and apparatus have been found to be unacceptable for small-wheel, carriage-type wheelchairs because they are often unable to counter the tendency of such wheelchairs to twist and/or flip over. Moreover, prior art methods and apparatus cannot be readily and easily adapted to secure small-wheel, carriage-type wheelchairs which are adjustable to accommodate the different needs of each particular individual, i.e., each different wheelchair can be adjusted to provide a different seating position for the user. Such adjustment results in widely varying relative wheel/handle configurations.

OBJECTS AND SUMMARY OF INVENTION

Accordingly, it is an object of this invention to provide novel and improved method and apparatus for securing wheelchairs against movement during transport.

It is another object of this invention to provide novel and improved method and apparatus for securing small-wheel, carriage-type wheelchairs against movement within a transport vehicle during transport.

It is a further object of this invention to provide method and apparatus which can be used to interchangeably secure conventional wheelchairs or small-wheel, carriage-type wheelchairs of varying constructions and configurations within a transport vehicle.

It is a still further object of this invention to provide method and apparatus for simply and expeditiously securing wheelchairs within a transport vehicle.

It is yet another object of this invention to provide method and apparatus for securing wheelchairs in a transport vehicle which can quickly and readily accommodate a variety of different types of wheelchairs and a variety of wheelchairs each of which is adjusted differently with a minimum amount of effort.

It is still another object of this invention to provide method and apparatus for securing wheelchairs in a transport vehicle whereby each wheelchair is secured against movement within the transport vehicle but nevertheless can be quickly and easily released for removal of the wheelchair from the transport vehicle.

It is yet a further object of this invention to provide method and apparatus for securing small-wheel, carriage-type wheelchairs in transport vehicles against twisting and flipping movements peculiar to such wheelchairs.

The method and apparatus of this invention involves simultaneously securing the handle and wheels of a wheelchair to a side wall and floor of a transport vehicle, respectively. The wheelchair is positioned in front of the side wall on which an interconnecting mechanism is mounted for reciprocating upward-downward movement. Coupled to opposite ends of the interconnecting mechanism are a handle locking component and a wheel locking component. When the interconnecting mechanism is shifted in a downward direction, the handle locking component and the wheel locking component simultaneously, respectively engage and secure the handle and wheels of the wheelchair against movement. Upward movement of the interconnecting mechanism causes the handle and wheel locking components to release the handle and wheels, respectively. The handle locking component includes a clamping device which engages and holds down the handle of the wheelchair preventing forward or backward movement and/or rotational movement about a horizontal and/or a vertical axis of the handle. The wheel locking component includes locking elements which extend through the spokes of the wheels of the wheelchair and walls which extend alongside the wheels, preventing rotation of the wheels about their horizontal axis and/or rotational movement of the wheels about vertical axis. The handle locking component is coupled directly to the interconnecting mechanism and moves upwardly and downwardly in conjunction with the interconnecting mechanism. Actuator mechanism is interposed between the wheel locking component and the interconnecting mechanism and translates the reciprocating upward and downward motion of the interconnecting member into reciprocating side to side movement of the locking elements, i.e., the locking elements move in a direction transverse to the direction of reciprocating motion of the interconnecting mechanism.

The novel features which are considered as characteristic of the invention are set forth in particular in the appended claims. The improved method and apparatus, however, both as to mode of operation and construction, together with additional features and advantages thereof, will be best understood upon perusal of the following detailed description of certain specific embodiments with reference to the accompanying drawing.

DESCRIPTION OF THE PREFERRED EMBODIMENTS

Figure 1:
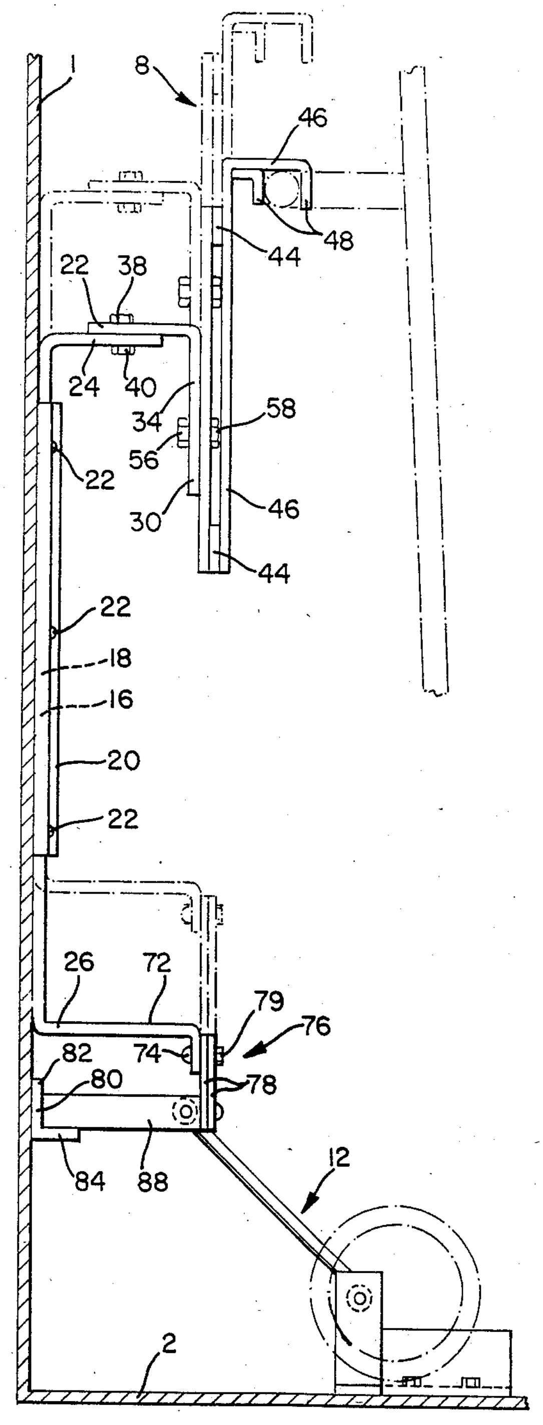
FIG. 1 is a side elevational view of an apparatus which embodies one form of the invention, with portions of the transport vehicle side wall and floor being shown in cross section and a portion of the wheelchair handle and one of the rear wheelchair wheels being shown with imaginary lines.

FIGS. 1 through 6 show a locking mechanism or apparatus constructed and assembled in accordance with one embodiment of the invention. The apparatus, generally denoted by the numeral 4, is shown installed in a transport vehicle having a side wall 1 and floor 2. FIG. 1 shows in solid line the closed or locked position of the apparatus and in imaginary line the open or unlocked position. The apparatus has a handle locking component 8, a wheel locking component 12 and an interconnecting member 16 coupled to both the handle locking and wheel locking components. The interconnecting member 16 has a body portion 18, an arm 24 and a leg 26. The body portion 18 is mounted on the side wall 1 of the transport vehicle for slidable, up and down movement by means of a plate 20. The plate 20 is bent so as to define with the vehicle side wall when mounted thereon a channel in which the body portion 18 of the interconnecting member 16 is slidably retained. The plate 20 can be mounted to the side wall by bolts 22 or any other suitable fastening means.

Figure 5:
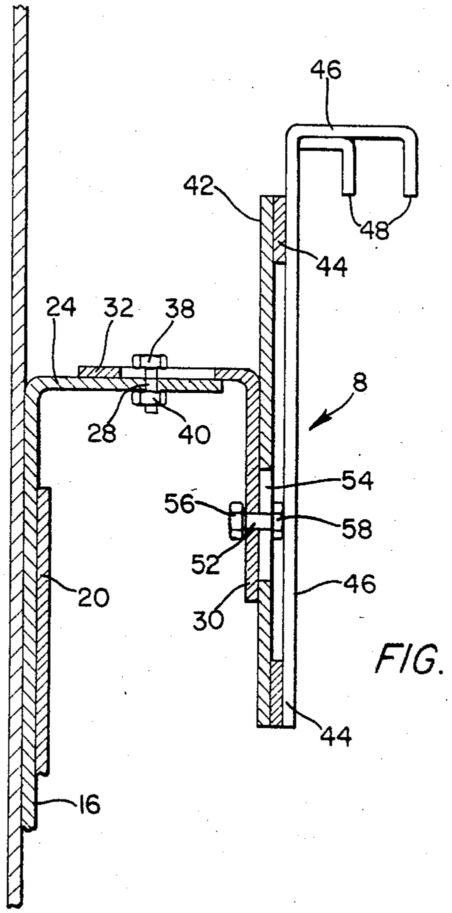
FIG. 5 is a fragmentary, vertical sectional view of the apparatus of FIG. 1 and a portion of the transport vehicle side wall as seen in the direction of the arrows from the line V—V of FIG. 2.
Figure 6:
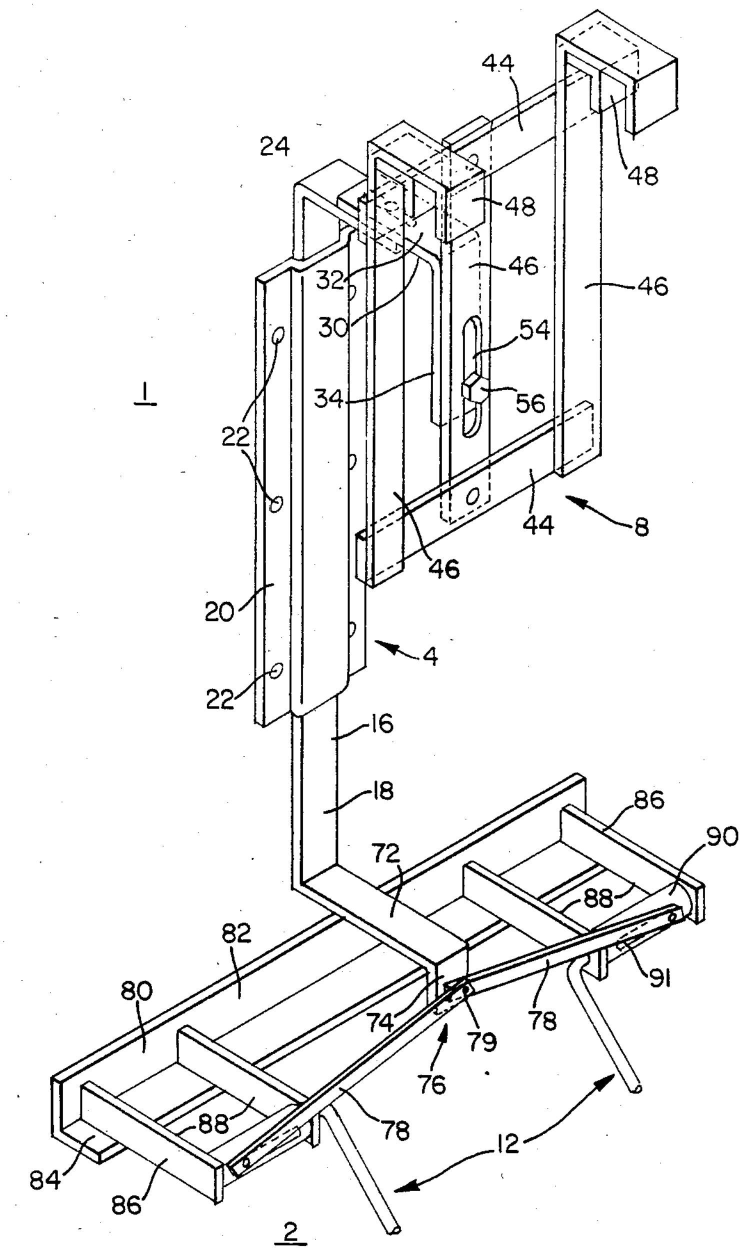
FIG. 6 is a generally front perspective view of the apparatus of FIG. 1.

The arm 24 of the interconnecting member 16 is provided with a hole 28 for coupling the handle locking component 8 FIG. 5 to the arm 24. The handle locking component has an L-bracket 30 a mounting plate 42, cross arms 44 and clamping members 46. The L-bracket 30 has a first leg 32 and second leg 34. A slot 36 is provided in the first leg 32. A bolt 38 is inserted through the hole 28 in the arm 24 and through the slot 36 in the first leg 32 and fastened with a nut 40. The slot 36 permits the L-bracket 30 to be moved relative to the arm 24 prior to tightening of the bolt 38 and nut 40. A hole 52 is provided in the second leg 34 of the L-bracket 30 and a slot 54 is provided in the mounting plate 42 for securing the mounting plate to the second leg by means of a bolt 56 and a nut 58. The slot 54 in the mounting plate 42 permits the mounting plate to be moved relative to the second leg 34 prior to tightening of the bolt 56 and nut 58.

Figure 2:
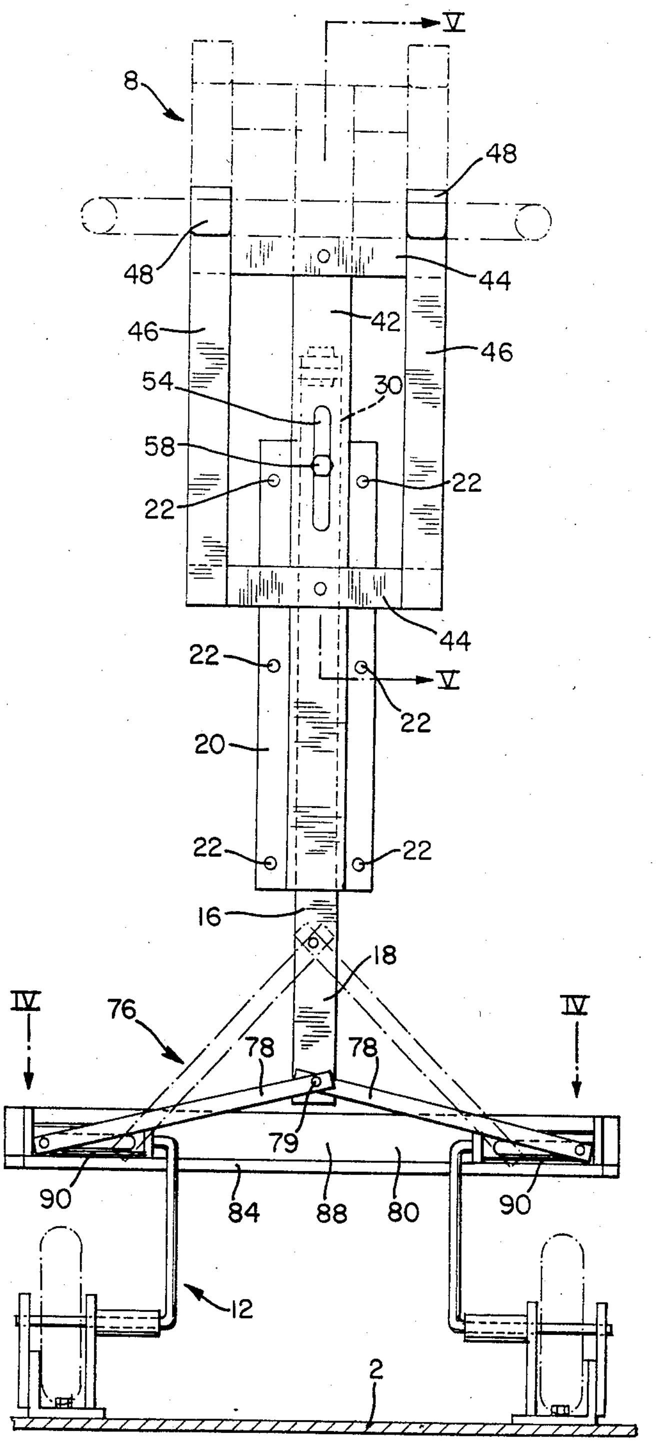
FIG. 2 is a front elevational view of the apparatus of FIG. 1 with a portion of the transport vehicle floor being shown in cross section and with a portion of the wheelchair handle and two of the rear wheelchair wheels being shown with imaginary lines.
Figure 3:
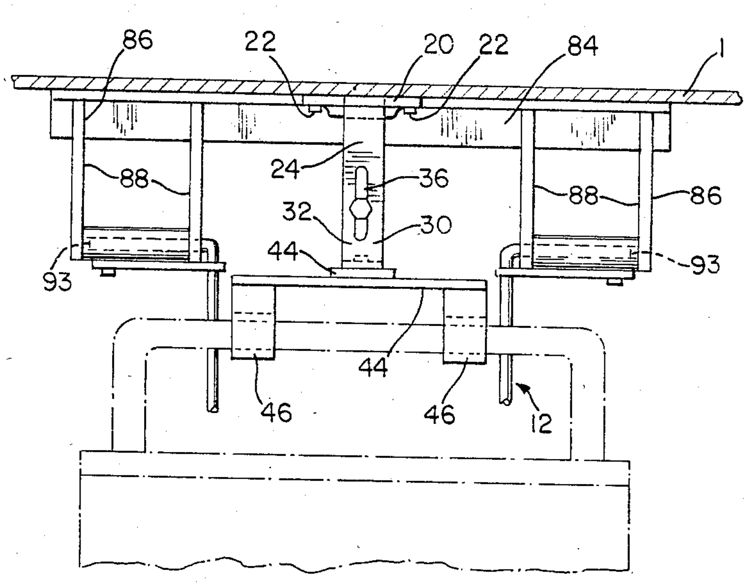
FIG. 3 is a fragmentary top plan view of the apparatus of FIG. 1 with a portion of the transport vehicle side wall being shown in cross section and with a portion of the wheelchair handle being shown with imaginary lines.
Figure 4:
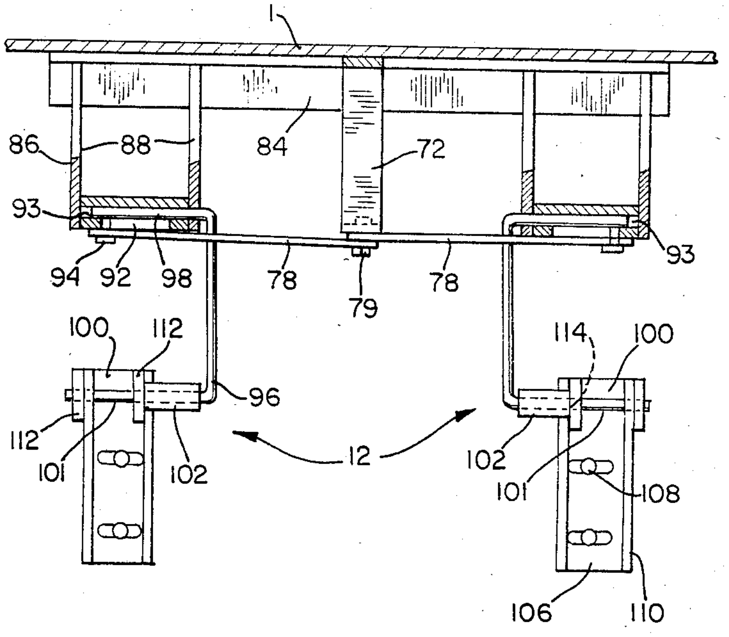
FIG. 4 is a horizontal sectional view of the apparatus of FIG. 1 and a portion of the transport vehicle side wall as seen in the direction of the arrows from the line IV—IV of FIG. 2.

The cross arms 44 are permanently fastened to the mounting plate about opposed ends of the mounting plate by welding or with fasteners or any other fastening means. The clamping members 46 are in turn permanently fastened about the ends of the cross arms 44. The clamping members 46 have latching fingers 48 which grip the handle of a wheelchair. The combination of cross arms 44 and clamping members 46 facilitate more positive control of the handle by distributing the forces applied to the handle over a larger area. The resultant moment arms for countering inertial tipping or rotating tendencies of the combined wheelchair and invalid individual is increased. The latching fingers 48 of the clamping members 46 extend down over the handle of the wheelchair and hold the handle down at two points, offset from the center line of the wheelchair (as best seen in FIG. 2), thus precluding tilting or rotation of the wheelchair. In addition, the latching fingers 48 hold the handle at both points against rearward and forward movement (i.e., left and right movement as seen in FIG. 1), thus precluding twisting movement of the wheelchair.

The interconnecting member 16 further includes a horizontal portion 72 attached to the bottom of the body portion 18 and a vertical or downwardly extending portion 74. An actuating mechanism 76 is connected between the downwardly extending portion 74 of the interconnecting member 16 and the locking component 12. The actuating member 76 includes struts 78 which are connected to the downwardly extending portion 74 by a bolt 79 for pivotal movement about the axis of the bolt 79. An L-shaped support member 80 of the actuating mechanism 76 is mounted to the side wall 1 of the transport vehicle and has a first leg 82 and a second leg 84. Guide mechanism 86 of the actuating mechanism 76 is affixed to and supported by the L-shaped support member 80. Arms 88 of the guide mechanism 86 extend outwardly from the side wall 1 of the side wall 1 of the transport vehicle. Two pairs of arms 88 are provided. Each pair of arms 88 is spaced apart and receives therebetween two guide plates 90. A slot 91 is provided in each front or outer guide plate and a groove 92 is provided in each rear or inner guide plate. Pins 94 are inserted first through holes 95 in the ends of the struts 78 remote from the ends of the struts which are mounted on the downwardly extending portions 74 by the bolt 79, and then through the slots 91 and into the grooves 92.

Transmission members 96 are provided for transmitting motion of the pins 94 to the wheel locking component 12. First ends 98 of the transmission members 96 are attached to the pins 94. In the embodiment shown, the pins 94 extend through holes 99 in the first ends 98 before the pins extend into grooves 92.

The wheel locking component 12 comprises channels 100 for receiving the rear wheels of the wheelchair and second ends 101 of the transmission members 96 for inserting through the wheels of the wheelchair while in the channel to retain the wheels in the channels. The channels are defined by mounting plates 104 mounted on the floor 2 of the transport vehicle by bolts 108. Each mounting plate 104 includes an upstanding portion 110 which extends across at least a substantial portion of the diameter of the wheel being held and upstanding portions 112 on either side of the wheel. Holes 114 are provided in the upstanding portions 112 for receiving the second ends 101 of the transmission members 96. Bearing sleeves 102 are provided for ensuring proper alignment of the second ends 101 with the holes 114 in both of the members 112 upon withdrawal and reinsertion of the second ends 101 through the holes 114.

The upstanding members 112 together with the second ends 101 of the transmission members 96 secure the rear wheels of the wheelchair against forward or backward movement (against left or right movement as seen in FIG. 1), thus ensuring that the wheelchair will not be able to flip over backwards, i.e., they preclude the front wheels from lifting off of the floor, the rear wheels from rolling forward and the handle from dropping out of the latching fingers 48. The elongated wall portions 110 preclude rotation of the rear wheels about a vertical axis, a problem peculiar to small-wheel, carriage-type wheelchairs. Specifically, while standard wheelchairs only permit one degree of rotational freedom to the rear wheels, i.e., about their horizontal axis, the rear wheels of a small-wheel, carriage-type wheelchair are permitted two degrees of rotational freedom, namely, about a vertical axis as well as about a horizontal axis. The unique combination of members 112, ends 101 and wall portions 110 are able to counter not only forward or backward movement of the small-wheel, carriage-type wheelchair but also to counter flipping or twisting motion.

The operational positions of the apparatus, and the inventive method are disclosed in solid and phantom lines in the FIGS. Specifically, FIG. 1 discloses imaginary lines the open position of the apparatus. The operator has pulled upwardly on the arm 24 of the interconnecting member 16, concommitantly causing the handle locking and wheel locking components to release the handle and rear wheels, respectively. The handle locking component releases the handle inasmuch as the upward motion of the interconnecting member 16 by the actuating mechanism 76. Upward movement of the leg 26 of the interconnecting member 16 causes the struts 78 to rotate towards each other (as seen in FIG. 2, the left hand strut rotates counterclockwise and the right hand strut rotates clockwise about the pin 79). Such rotational movement of the struts inwardly towards each other causes the pins 94 to move inwardly towards each other along the guide paths to inward horizontal movement of the transmission members 96, thus causing the second ends 101 of the transmission members 96 to be retracted from engagement with the wheels, freeing the wheels for movement out of the channels 100.

When it is desired to secure a wheelchair with the locking mechanism or apparatus 4, the wheelchair is backed up against the vehicle wall until the rear wheels are in the channels 100 and the handle is underneath the latching fingers 48. If it is found that, when the rear wheels are in the channels 100, the handle is not positioned underneath the latching fingers 48, the bolt 38 and nut 40 can be loosened to allow movement of the first leg 32 relative to arm 24 in a left or right direction as seen in FIG. 5 until the latching fingers are positioned above the handle. A bolt and wing-nut combination can be used in place of the bolt 38 and nut 40 to provide easy and ready adjustability of the mechanism without requiring the use of any tools. Once the wheelchair is positioned with the wheels in the channels and the handle beneath the latching fingers, the operator pushes down on the arm 24 of the interconnecting member 16, causing the latching fingers 48 of the handle locking component 8 to engage the handle and the leg 26 of the interconnecting member to move downwardly, causing the struts 78 to rotate about the pin 79 away from each other and thus the pins 94 to move outwardly guided by the slots 91 and grooves 92, with such outward motion of the pins 94 in turn causing outward movement of the second ends 101 of the transmission members 96 whereby the second ends 101 pass through the spokes of the wheels and into the holdes 114 provided in the outer upstanding portions 112.

For ease of operation, it is possible to provide an extension on the body 18 of the interconnecting member 16, which extension would extend beyond the arm 24 (or above the arm 24 as seen in FIG. 1), coaxially with the body 18. In this manner, the operator could more readily reach the apparatus or apply the force to the interconnecting member needed to either release or engage the apparatus.

In the event that, upon initially engaging the locking mechanism, it is found that the latching fingers 48 do not fully engage the handle, the vertical positioning of the handle locking component can be adjusted by loosening the bolt 56 and the nut 58 and moving the mounting plate 42 and thus the clamping member 46 and the latching fingers 48 vertically relative to the second leg 34 of the L-bracket so that the latching fingers 48 fully engage the handle in the locked position Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my our contribution to the art and, therefore, such adaptations should and are intended to be comprehended within the meaning and range of equivalence of the appended claims.

What I claim is:

1. An apparatus for interchangeably securing conventional wheelchairs which have two small forward and two large rear spoked wheels and adjustable carriage-type wheelchairs which have a handle and two small forward and two small rear spoked wheels against movement without necessitating modification of the structural configuration of the apparatus, comprising interconnecting means mounted in a substantially vertical position for reciprocating movement in first generally upward and second generally downward directions and having a first upper end and a second lower end, handle locking means mounted on said first upper end for engaging and securing the handle of carriage-type wheelchairs, wheel locking means for engaging and securing the two rear wheels of conventional and carriage-type wheelchairs and actuator means interposed between and connected to said second lower end and said wheel locking means for translating the reciprocating movement of said second lower end in said first and second directions into generally horizontal reciprocating movement in third and fourth directions, which translated movement is transmitted by said actuator means to said wheel locking means, movement of said interconnecting means in said second direction simultaneously causing said handle locking means to engage and secure the handle of the wheelchair and said actuator means to translate said movement in said second direction into movement in said fourth direction which is transmitted to said wheel locking means, causing said wheel locking means to engage and secure the two rear wheels to thereby prevent movement of the wheelchair, and movement of said interconnecting means in said first direction simultaneously causing said handle locking means to release the handle and said actuator means to translate said movement in said first direction into movement in said third direction which is transmitted to said wheel locking means, causing said wheel locking means to release the two rear wheels, to thereby permit movement of the wheelchair.

2. The apparatus of claim 1 wherein said handle locking means comprises a clamping mechanism for engaging and holding down the handle of the wheelchair and preventing movement of the wheelchair handle towards and away from said interconnecting mechanism and rotational movement of the wheelchair handle about horizontal and vertical axes which are not colinear with the axis of the wheelchair handle.

3. The wheelchair of claim 2 wherein said wheel locking means comprises walls extending alongside the two rear wheels and locking elements engaging and extending through the spokes of the two rear wheels and preventing linear movement of the two rear wheels, rotational movement of the wheels about their respective axes, relative rotational movement of the two rear wheels about vertical axes and, in cooperation with said clamping mechanism, rotational movement of the wheelchair about axes colinear with the handle axis and with the axis defined by an imaginery line extending between the points where the locking elements engage the two rear wheels.

4. The apparatus of claim 2, further comprising first means for adjustably connecting said first upper end of said interconnecting member and said handle locking mechanism to permit variation of the horizontal positioning of the handle locking mechanism relative to the interconnecting member.

5. The apparatus of claim 4, wherein said handle locking mechanism comprises at least two spaced clamping members and second means for adjustably connecting said clamping members to said first adjustable connecting means to permit variation of the vertical positioning of the clamping members relative to the first adjustable connecting means.

6. The apparatus of claim 5, wherein each said clamping member comprises at least two spaced latching fingers for gripping the handle of the wheelchair.

7. The apparatus of claim 6, wherein said latching fingers are spaced apart such that they engage the handle of the wheelchair at points offset from the center line of the wheelchair.

8. The apparatus of claim 7, wherein the latching fingers are configured so that when they engage the handle of the wheelchair they extend down over the handle.

9. The apparatus of claim 1, wherein said actuator means comprises first and second generally horizontal slots, first and second struts, each having a first end pivotally connected to said second lower end of said interconnecting means and a second end having a pin mounted thereon and slidably disposed, respectively, in said first and second slots, and first and second transmission members having first ends connected to said pins.

10. The apparatus of claim 9, wherein said wheel locking means comprises first and second channels for receiving the two rear wheels and second ends of said first and second transmission members for engaging and inserting through the two rear wheels.

11. The apparatus of claim 10, wherein each said channel comprises an upstanding wall portion extending across at least a substantial portion of the diameter of the wheel and having a hole for receiving said second end of one of said transmission members.

12. The apparatus of claim 11, further comprising bearing sleeves mounted on said wall portions aligned coaxially with said holes for ensuring proper alignment of said second ends with said holes upon withdrawal and reinsertion of said second ends from the wheels.

13. An apparatus for interchangeably securing conventional wheelchairs which have two small forward and two large rear spoked wheels and adjustable carriage-type wheelchairs which have a handle and two small forward and two small rear spoked wheels against movement within a vehicle without necessitating modification of the structural configuration of the apparatus, comprising interconnecting means mounted on a wall in the vehicle in a substantially vertical position for reciprocating movement in first generally upward and second generally downward directions and having a first upper end and a second lower end; a clamping mechanism for engaging and securing the handle of carriage-type wheelchairs; first means for adjustably connecting said first upper end of said interconnecting member and said clamping mechanism to permit variation of the horizontal positioning of the clamping mechanism relative to the interconnection member; said clamping mechanism comprising two spaced clamping members and second means for adjustably connecting said clamping members to said first adjustable connecting means to permit variation of the vertical positioning of the clamping members relative to the first adjustable connecting means; each said clamping member comprising two latching fingers for gripping the handle of the wheelchair; said latching fingers being spaced apart such that they engage the handle of the wheelchair at points offset from the center line of the wheelchair and being configured so that when they engage the handle of the wheelchair they extend down over the handle; wheel locking means for engaging and securing the two rear wheels of conventional and carriage-type wheelchairs; actuator means interposed between and connected to said second lower end and said wheel locking means for translating the reciprocating movement of said second lower end in said first and second directions into generally horizontal reciprocating movement in third and fourth directions, which translated movement is transmitted by said actuator means to said wheel locking means, movement of said interconnecting means in said second direction simultaneously causing said clamping mechanism to engage and secure the handle of the wheelchair and said actuator means to translate said movement in said second direction into movement in said fourth direction which is transmitted to said wheel locking means, causing said wheel locking means to engage and secure the two rear wheels to thereby prevent movement of the wheelchair, and movement of said interconnecting means in said first direction simultaneously causing said clamping mechanism to release the handle and said actuator means to translate said movement in said first direction into movement in said third direction which is transmitted to said wheel locking means, causing said wheel locking means to release the two rear wheels, to thereby permit movement of the wheelchair; said actuator means comprising first and second generally horizontal slots, first and second struts, each having a first end pivotally connected to said second lower end of said interconnecting means and a second end having a pin mounted thereon and slidably disposed, respectively, in said first and second slots and first and second transmission members having first ends connected to said pins; said wheel locking means comprising first and second channels for receiving the two rear wheels and second ends of said first and second transmission members for engaging and inserting through the two rear wheels; each said channel comprising an upstanding wall portion extending across at least a substantial portion of the diameter of the wheel and having a hole for receiving said second end of one of said transmission members; and bearing sleeves mounted on said wall portions aligned coaxially with said holes for ensuring proper alignment of said second ends with said holes upon withdrawal and reinsertion of said second ends from the wheels.

14. A method of securing small wheel, carriage-type wheelchairs against movement within a vehicle comprising the steps of:

providing the vehicle with a locking mechanism mounted therein, the locking mechanism including a wheel locking component having two wheel channels, a handle locking component, and a movable member interconnecting the components;

pulling up on the interconnecting member to prepare the locking mechanism to receive the wheelchair;

positioning the wheelchair so that the handle of the wheelchair is beneath the handle locking component of the locking mechanism and the wheels of the wheelchair are within the channels of the wheel locking component of the locking mechanism; and pushing down on the interconnecting member of the locking mechanism thereby simultaneously engaging the handle locking component and the wheelchair handle and the wheel locking component and the two rear wheels of the wheelchair to secure the wheelchair against movement within the vehicle.

15. The method of claim 14, further including the step of adjusting the handle locking component of the locking mechanism so that latching fingers of the handle locking component are aligned directly above the handle of the wheelchair prior to pushing down on the interconnecting member.

16. The method of claim 15, further including the step of adjusting the handle locking component after pushing down on the interconnecting member so that the latching fingers of the handle locking component extend down over the handle.

* * * * *